Figure 1:
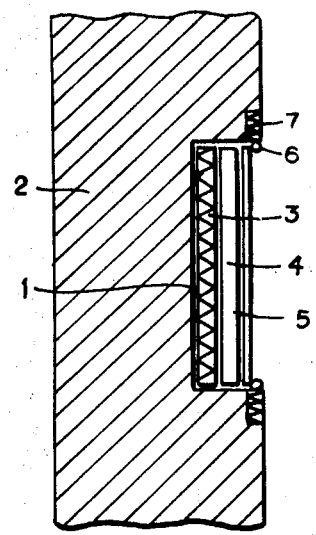

United States Patent

[11] 3,604,781

| [72] | Inventors | Rudolf Gaeth<br>Limburgerhof;<br>Karl Hagen, Friedelsheim; Hans-Joachim<br>Orthmann, Limburgerhof; Karl Gustav<br>Linn, Hochdahl, all of, Germany |
|---|---|---|
| [21] | Appl. No. | 880,046 |
| [22] | Filed | Nov. 26, 1969 |
| [45] | Patented | Sept. 14, 1971 |
| [73] | Assignee | Badische Anilin- & Soda-Fabrik<br>Aktiengesellschaft<br>Ludwigshafen/Rhein, Germany |
| [32] | Priority | Dec. 3, 1968 |
| [33] | | Germany |
| [31] | | P 18 12 319.8 |

[54] REFLECTOR FOR WARNING ROAD TRAFFIC OF ICING CONDITIONS
7 Claims, 2 Drawing Figs.

[52] U.S. Cl............................................. 350/97,
73/356
[51] Int. Cl....................................... G02b 5/12

[50] Field of Search............................................. 350/61, 67,
97, 100, 102, 103, 104–106, 109, 160, 179, 267;
73/356; 177/311; 116/114

[56] References Cited
UNITED STATES PATENTS

| 2,359,737 | 10/1944 | Peters et al. .................. | 177/311 |
| 2,710,274 | 6/1955 | Kuehl............................. | 73/356 |
| 3,433,075 | 3/1969 | Sutherland.................... | 350/160 P |

Primary Examiner—David Schonberg
Assistant Examiner—Michael J. Tokar
Attorney—Johnston, Root, O'Keeffe, Keil, Thompson & Shurtleff ABSTRACT: A reflector containing a light-reflecting layer, particularly for affixation to road edge marker posts, for warning traffic of the existence of icing conditions. The reflector consists of a transparent capsular container located in front of a light-reflecting layer and filled with a liquid which extends over the surface of the layer, and which as a result of a change of state loses the transparency it possesses at higher temperatures when temperatures just above the freezing point of water prevail.

PATENTED SEP 14 1971  3,604,781

INVENTORS:
RUDOLF GAETH
KARL HAGEN
HANS-JOACHIM ORTHMANN
KARL GUSTAV LINN
BY

*Johnston, Root, O'Keeffe, Keil, Thompson & Shurtleff*
ATT'YS

REFLECTOR FOR WARNING ROAD TRAFFIC OF ICING CONDITIONS

Methods known in the art for measuring temperature have not been suitable for indicating danger to traffic as a result of ice formation on roads. On the one hand the employment of temperature sensors for switching optical warning signals on and off is impracticable because of the capital cost and the expense involved in their maintenance; on the other hand, the obvious possibility of employing temperature-sensitive paints for instance on road marker posts is ruled out because the lowest temperature at which commercially available temperature-sensitive paints change color is +40° C. Moreover, the color change of temperature-sensitive paints is irreversible, i.e. once the color has changed it remains so, even when the temperature returns to its former level.

The object of the invention is to provide an indicator capable of giving a warning of road icing conditions which is cheap to produce, reliable in operation and requires virtually no maintenance.

This object is achieved with a reflector containing a light-reflecting layer, by providing, in accordance with the invention, in front of the reflecting layer a transparent capsular container filled with a liquid which extends over the surface of the reflecting layer, and which as a result of a change in state loses the transparency it possesses at higher temperatures when temperatures just above the freezing point of water prevail. The reflecting layer may advantageously be colored green and surrounded by a light-reflecting, red-colored, continuous or discontinuous ring-shaped layer. The reflecting layer which is covered by the liquid may be embedded in the rear wall of the container for the liquid. Liquids which are suitable for filling the container should freeze at temperatures between +10° and 0° C. and preferably between +5° and 0° C. The liquid may be a binary solution; particularly good results have been obtained by using a p-xylene-naphthalene or a cyclohexane-lauric acid system, particularly when the composition of the mixture is eutectic.

Figure 2:
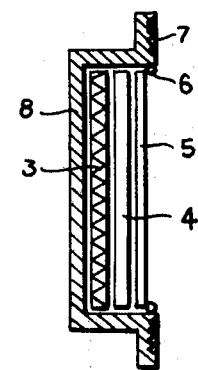

Two embodiments of the reflector according to the invention are shown in the accompanying drawing and will be hereinafter described in greater detail. FIG. 1 is a longitudinal section of a road edge marker post with an inserted reflector;

FIG. 2 is a longitudinal section of a reflector in the form of a capsular insert.

As shown in FIG. 1, a recess 1 formed in a road edge marker post 2 contains a flat, light-reflecting layer 3 colored green and, in front of it, a transparent capsular container 4 filled with a liquid such that the reflecting layer 3 is completely covered by the liquid in the container 4. The liquid-filled container 4 may itself be protected by an outer transparent plate 5 which may be secured in the recess 1 of the post 2 by a retaining ring 6. The reflecting green layer 3 in the illustrated arrangement is surrounded by a continuous or discontinuous ring of reflecting layer 7 colored red, which may be let into the face of the post 2.

The embodiment in FIG. 2 differs from the arrangement described in FIG. 1 merely in that reflecting layer 3, liquid-filled container 4, transparent plate 5 and retaining ring 6 are all contained in a capsular insert 8; the reflecting red-colored layer 7 may be located in the rim of insert 8. A reflector in accordance with this embodiment can be inserted as a complete unit into a recess 1 in a road edge marker post 2.

Suitable materials for the production of reflecting layers 3 and 7, liquid container 4 and plate 5 are glass and transparent plastics, such as polyethylenes and polyamides, whereas insert 8 may, for example, be of metal or plastic.

The liquid in container 4 must lose the transparency which it possesses at higher temperatures when it is cooled to a temperature just above the freezing point of water and must become opaque as a result of a change of state from liquid to solid. Whereas at higher temperatures a beam of light striking the reflector will penetrate plate 5 and liquid-filled container 4 and will cause the green reflecting layer to shine brightly, a beam of light at a temperature below that at which the liquid changes state will not penetrate the liquid in the container with the result that the normal green signal will no longer be emitted. This will warn a driver that at least near the ground the temperature is such that the road surface is likely to ice over. The ring-shaped red signal layer 7 which surrounds the green reflecting layer and continues to shine red provides an additional warning signal to the driver of the risk of surface icing. The reflection intensities of the green and red colored reflecting layers may be adjusted so that when green reflecting layer 3 is not obscured it will outshine red reflecting ring 7. The reflecting layers 3 and 7 may, of course, be replaced by signals, provided with an electric light source, but in view of the expenditure on the necessary electrical installations this would be practicable only in exceptional circumstances.

The temperature at which the liquid in container 4 changes state should preferably be a few degrees above the freezing point of water. This will make allowance for the fact that the road edge marker post cools more slowly than the ambient air. When the ambient air cools fairly rapidly to the freezing point of water, the reflector in the road edge marker post will initially be a few degrees warmer than its environment and it will come down to the ambient temperature only slowly. Precisely under such conditions should the warning signal indicating the risk of icing be effective, since the danger to a driver as a result of an unexpected icy patch is much greater than that from a road that has already completely iced over.

For filling the container, all liquids are in principle suitable which change their state at a temperature between about +10° and 0° C., preferably between +5° and 0° C. Pure liquids are for instance the following substances whose freezing points are given in brackets (° C.): benzene (5.5° C.), tetradecane (5.5° C.), dibenzyl ether (3.6° C.), formamide (2.2° C.), (N,N)-di-methylaniline (2.5° C.).

However, not only pure liquids but also multicomponent mixtures may be used, such as $H_2SO_4$ + 11 mol percent of $H_2SeO_4$ (3.2° C.); phenol + 57.5 mol percent p-xylene; acetic acid + 18.5 mol percent of $SbCl_3$ (4° C.); benzene +3.3 mol percent of benzoic acid (4.3° C.).

In determining the liquid to be used, it should be borne in mind that it should freeze quickly, i.e. without appreciable supercooling, that it should be easy and cheap to produce, that it should not attack the container material and that it should be chemically stable; in view of these requirements two pairs of substances have been found to be particularly useful, namely the mixture of p-xylene with 18.2 mol percent of naphthalene, corresponding to relative proportions of 86.7 g. of xylene and 23.3 g. of naphthalene, which has a eutectic point at +4.2° C., and the mixture of cyclohexane and 6.8 percent of lauric acid, corresponding to relative proportions of 78.5 g. of cyclohexane to 13.6 g. of lauric acid, which has a eutectic point at +3.2° C. The ratios in both mixtures are advantageously adjusted to the eutectic point, because the temperatures at which the mixtures change state will then be within the range of from +5° to 0° C. which is of particular importance.

The advantage of the reflector according to the invention resides more particularly in the fact that it is a cheap, easily produced and reliable signalling device for warning road users of icing conditions, and in the fact that it requires practically no maintenance and can be inserted in any road edge marker post.

We claim:

1. A reflector containing a light-reflecting layer for use as a traffic warning sign and adapted for affixation to road edge marker posts, which comprises a light-reflecting layer located behind a transparent capsular container filled with a transparent liquid having a freezing point between +10° C. and 0° C., said liquid covering the entire light-reflecting surface of said reflecting layer and losing the transparency it possesses at higher temperatures above its freezing point as a result of the freezing of said liquid when atmospheric temperatures slightly above the freezing point of water prevail.

2. A reflector as claimed in claim 1, wherein the liquid-filled container has a rear wall forming said light-reflecting layer.

3. A reflector as claimed in claim 1, wherein said light-reflecting layer is green colored.

4. A reflector as claimed in claim 1, wherein said light-reflecting layer which is covered by the liquid is surrounded by a red-colored light-reflecting layer.

5. A reflector as claimed in claim 1, wherein the liquid is a binary solution.

6. A reflector as claimed in claim 5, wherein the binary solution consists of a mixture of p-xylene and naphthalene, particularly a mixture corresponding to the eutectic proportions.

7. A reflector as claimed in claim 5, wherein the binary solution consists of a mixture of cyclohexane and lauric acid, particularly a mixture corresponding to the eutectic proportions.